United States Patent [19]

Klaus

[11] Patent Number: 4,998,863
[45] Date of Patent: Mar. 12, 1991

[54] MAGNETIC PUMP DRIVE

[75] Inventor: Franz Klaus, Bochum, Fed. Rep. of Germany

[73] Assignee: Franz Klaus Union Armaturen Pumpen GmbH & Co., Fed. Rep. of Germany

[21] Appl. No.: 180,002

[22] Filed: Apr. 11, 1988

[30] Foreign Application Priority Data

Apr. 11, 1987 [DE] Fed. Rep. of Germany ....... 3712459

[51] Int. Cl.$^5$ .......................................... F04B 49/10
[52] U.S. Cl. ..................... 417/63; 417/420; 417/423.11; 417/423.14; 464/29
[58] Field of Search ................ 417/63, 372, 373, 420, 417/423.1, 423.11, 423.12, 423.14; 464/17, 29; 310/87, 57, 52, 54, 55, 64; 73/46; 340/682; 92/5 R; 165/47, 70, 11.1

[56] References Cited

U.S. PATENT DOCUMENTS

| | | | |
|---|---|---|---|
| 2,662,478 | 12/1953 | Surre | 417/63 |
| 3,131,638 | 5/1964 | Wilson et al. | 92/5 R |
| 3,163,790 | 12/1964 | White | 310/54 |
| 3,605,566 | 9/1971 | Vetter | 417/63 |
| 3,661,060 | 5/1972 | Bowen | 417/63 X |
| 4,013,384 | 3/1977 | Oikawa | 417/420 X |
| 4,120,618 | 10/1978 | Klaus | 417/420 |
| 4,226,574 | 10/1980 | Villette | 417/420 |
| 4,569,634 | 2/1986 | Mantell | 417/63 |
| 4,600,821 | 7/1986 | Fichtner et al. | |
| 4,752,194 | 6/1988 | Wienen et al. | 417/420 |
| 4,838,763 | 6/1989 | Kramer et al. | 417/63 |
| 4,854,823 | 8/1989 | Hatting et al. | 417/63 |

FOREIGN PATENT DOCUMENTS

| | | |
|---|---|---|
| 8208046.1 | 8/1982 | Fed. Rep. of Germany . |
| 3334638 | 3/1984 | Fed. Rep. of Germany ........ 417/63 |
| 3337086 | 5/1985 | Fed. Rep. of Germany . |
| 684679 | 9/1979 | U.S.S.R. . |

OTHER PUBLICATIONS

Magazine article, "The Double Walled Safety", Kramer and Neumaier, 4 pages, Mar. 1987.

Primary Examiner—Leonard E. Smith
Assistant Examiner—Eugene L. Szczecina, Jr.
Attorney, Agent, or Firm—Banner, Birch, McKie & Beckett

[57] ABSTRACT

A magnetic pump drive comprises a double-walled isolating shell having an inner shell and an outer shell. The inner shell and the outer shell are in contact at least along a cylindrical section of both shells. In the contact area, a channel system is incorporated between the shells by means of which channels the intactness of both shells may be checked. Channels of the channel system have the shape of a screw-channel. The magnetic pump drive so constructed closely approximates the characteristics of one constructed with a unitary thick-walled isolation shell.

18 Claims, 1 Drawing Sheet

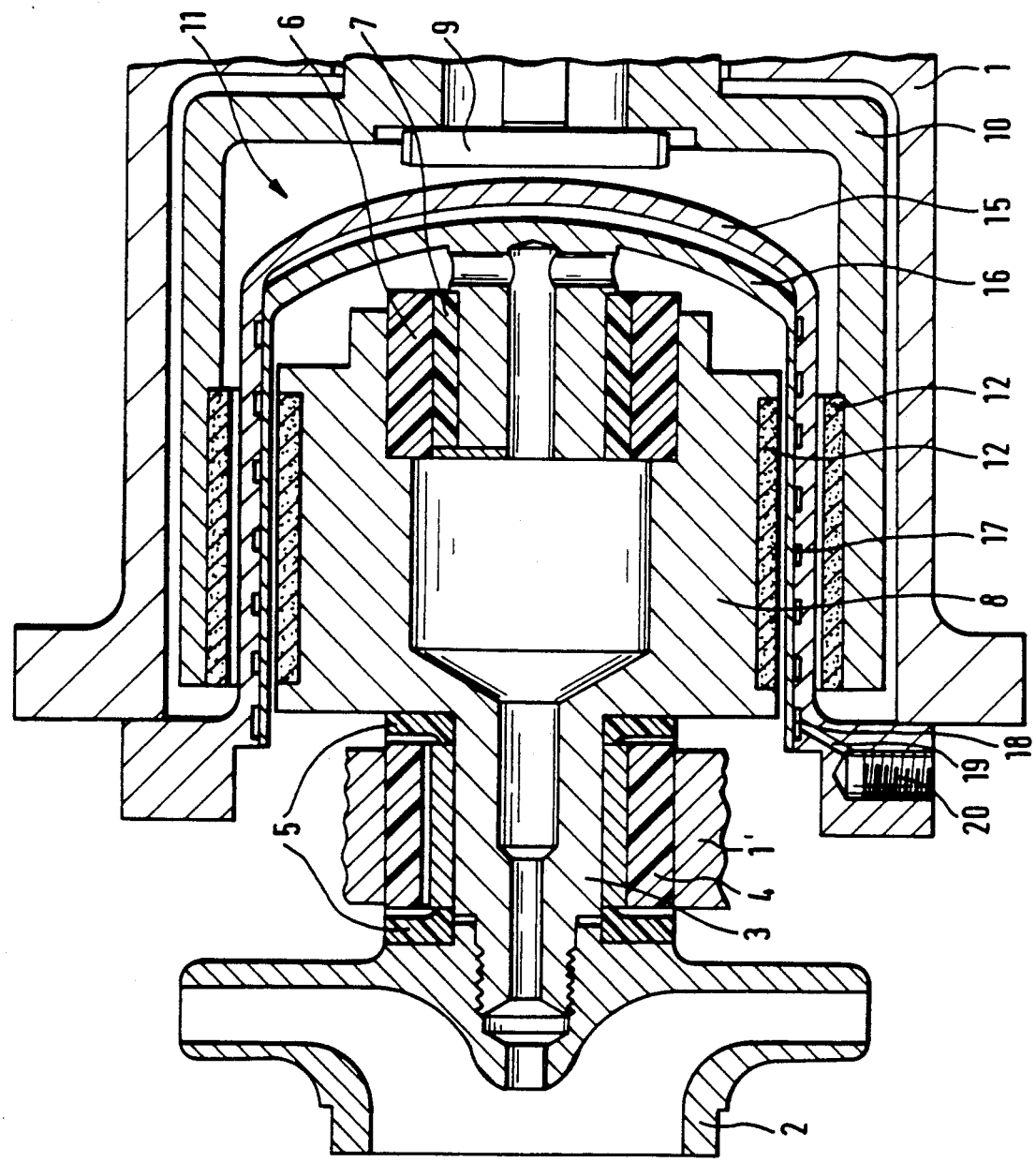

MAGNETIC PUMP DRIVE

BACKGROUND OF THE INVENTION

1. Field of the Invention

The present invention relates to the field of magnetic pump drives and, more particularly, to a magnetic pump drive comprising a double-walled isolating shell. In particular, the magnet pump drive comprises a driver driven by a motor, a rotor encircled by the driver and connected with an impeller of the pump, at least two circles of permanent magnets, one of the two circles being attached to a cylindrical face of the rotor respectively and the driver in opposite relation and a stationary isolation shell. The stationary isolation shell, which encircles the rotor, is filled by the medium to be pumped, and is sealed against the housing of the pump. The force of the permanent magnets passes through the shell for effecting the drive from the driver to the rotor.

2. Descripton of the Prior Art

Magnetic pump drives have been known in the art for many years. The known drives have proven to be reliable in the chemical industry and in nuclear power stations. Because there is no shaft duct and thus no leakage along a shaft out of a sealing, these pumps have only gaskets which are more easily handled and which are much less prone to a leak than a seal against a rotating shaft.

In order to achieve a satisfying efficiency, the permanent magnets which are arranged on opposite sides on the rotor and the driver respectively and which are arranged on each device in changing polarity for a permanent pulling force, have to be close together. However, tolerances and especially safety against damage to the isolation shell has to be observed. Generally, there is a distance of approximately 4 mm between two permanent magnets which face each other and which are attached to the rotor and the driver respectively. The gap between the two circles of permanent magnets is crossed by the cylindrical section of the isolation shell, and this section is generally 1 to 2 mm thick.

As a result of damage or wear to the bearings of the driver and/or the rotor as well as in the case of an inadvertent introduction of a solid particle in the medium to be pumped, it may occur that the isolation shell is damaged so that the medium contaminates the environment which was retained by the isolation shell. It is common practice to use alarm devices and also to maintain a sealing of the driver housing which is capable of retaining the medium in the event of a damaged isolation shell even after an extened dry running.

Recently, the effectiveness of transmitting the motor performance onto the impeller of a pump by using a permanent magnet coupling has become of reduced importance. Improved safety is much more appreciated which is mainly achieved by thickening the wall sections of the isolation shell. Consequently, not only the gap between each pair of opposed permanent magnets is increased but also the thermal loss by eddy currents within the isolation shell unless the isolation shell is constructed from electrically non-conductive material as, for instance, plastic materials.

SUMMARY OF THE INVENTION

It is therefore an object of this invention to improve the magnetic drive of the aforementioned kind so that an imminent leakage of the isolation shell can be detected before the isolation shell is actually leaking.

It is a further object of this invention to maintain a rather strong design of the isolation shell which keeps its form even under high pressure.

It is still a further object of the invention to improve the resistance against corrosion when aggressive media are pumped without sacrificing any strength of the isolation shell.

In order to meet these objects, the present invention comprises an isolation shell that is a double-walled shell having an outer shell and an inner shell, the outer shell and the inner shell contacting each other at least in a cylindrical section. The double-walled shell includes a channel system comprising screw channels connecting the outer shell and the inner shell in the area of contact.

The channel system allows a check of the intactness of the outer shell and the inner shell by humidity sensors or pressure gauges. At the same time, the basic shape of a one-piece, thick-walled isolation shell is retained as much as possible. The basically robust design of a thick-walled isolation shell is especially appreciated in the cylindrical section of the double-walled isolation shell since a small gap between the permanent magnets of each magnet pair is still kept for obtaining a good efficiency. In other words the danger of damage is rather high in the cylindrical section. Since not only the outer shell but also the inner shell may be damaged, both shells should be designed so that each shell copes with the pressure of the system of which the pump is one part. Even if one shell bursts, the other shell is capable of withstanding the pressure prevailing within the pump. An exception to this rule is described later.

The contact zones at least in the cylindrical section of the outer shell and the inner shell provide a support for each other which leads to properties of an almost unitary thick-walled isolation shell. There is the further advantage that the channel system between both shells is not subjected to volume changes if pressure impulses occur within the medium to be pumped or which may be generated by the pump itself, since both shells stretch and shrink by the same amount while keeping contact if the pressure within the isolation shell is varying. In this way false alarms are prevented which may always occur if pressure variations of a peak or pulsing nature cause the space between the spaced outer and inner shells to decrease and increase, the changing volume of the space thus leading to an alarm setting pressure change.

In well designed isolation shells, the shell bottom has a spherical shape, i.e. basically the shape of a ball section whereby a deformation is mostly prevented. For this reason, it is not too necessary that the outer shell and the inner shell make contact also in the section of the bottom. Under a pressure increase within the isolation shell, the cylindrical section is at first inclined to take the form of a ball or sphere because the bottom of the isolation shell has already this ideal form so that at the bottom there is as good as no deformation. Of course, also in this area a contact can be provided between both shells which enclose a channel system extended to this area.

The property of a double wall is very important in the area of the bottom of the isolation shell. This is especially true for those isolation shells which neither have a bearing nor webs or other protrusions. Due to the rotation of the rotor, solid particles have the tendency to collect in this area which follow the rotation of the rotor and thus create a permanent circular movement on the inside of the isolation shell which may lead to a damage of the bottom after a long period of use.

A very effective and statically favorable channel system is achieved by creating a screw line on the inside of the outer shell which preferably leads at the open end of the double shell isolation shell into a ring chamber. In this design the outer shell is kept in most areas as a thick-walled structure which has a groove under a pitch like a screw trace. Damages, especially of the inner shell, mostly occur in the form of a circumferential groove when for instance the rotor is reeling due to a bearing damage or the like. The circumferential groove will meet the screw line channel at least in one place so that the damage of the inner shell can be detected by humidity sensors or pressure sensors which are attached to the channel system. Also a vacuum control can be used for setting an immediate alarm. The same conditions apply for the outer shell which may be damaged by the driver; however, damages to the outer shell are very rare.

By the above given explanations, it is desirable to have a mostly integral double-walled isolation shell which is for instance effected by creating a contact under protension between both shells. In order to achieve this structure, either the outer shell is shrunk warm over the inner shell or the inner shell is placed into the outer shell in a condition of deep cooling. Independently from the contact between both shells, the outer shell and the inner shell should be welded together at the open end so that a manageable unit exists in the shape of a double-walled isolation shell.

A double-wall isolation shell allows, so to speak, a lining of the isolation shell, i.e. a choice of different materials for the outer shell and inner shell. This can be important if an aggressive medium has to be pumped. The outer shell may then be made from a material of a low quality which would resist the attacks of the medium for a certain period of time but not over longer periods of use.

Under extreme pressure loadings of the pump and thus of the isolation shell, a very bulky structure is necessary with a bad efficiency if both shells are separately pressure proof. In these cases, only the outer shell is preferably pressure proof while the inner shell is more or less a lining which contributes only marginally to the pressure resistance. It is then advisable to reduce the possibility of damage of the outer shell for instance by installing a reel check for the driver. The coupling housing is provided for instance in a distance of one quarter of the circle by two approach switches which are tuned to a certain value.

This value refers to the distance between the outer surface of the driver to the sensing surfacing of the approach switches during a normal play of the bearings. If now, by a bearing damage or by any fracture, the driver starts to reel or stars to sink down, the pump may be switched off by the reaction of the approach switches. In this way a damage of the outer shell can be prevented very effectively.

The inner shell which may be rather thin in some cases may contribute to the pressure resistance of the double-walled shell isolation shell when both shells are not only touching each other in the areas of contact but are connected to each other so that there is a very rigid structure in which the channel system keeps both load charged elements separated. A corresponding structure is very resistant against deformation and thus against pressure loads. The connection can be carried out by bonding, glueing, soldering, brazing or diffusion welding. This kind of connection may be carried out in any case independently of a high system pressure of the system whereof the pump is a part.

BRIEF DESCRIPTION OF THE DRAWINGS

An embodiment of the invention which is shown in the drawing will be explained hereinafter in greater detail. The only FIGURE of the drawing shows a cross-sectional view through a magnetic pump drive according to the invention with a double-walled isolation shell.

DETAIL DESCRIPTION

The shown embodiment has a coupling housing comprising portions 1, 1' to which the pump housing is attached by bolts. The pump housing is not shown but is well known to persons skilled in the art.

With the pump housing, an impeller 2 rotates which is connected to a rotor 8 with the aid of a shaft 3. The shaft 3 and the rotor 8 form an integral component. The shaft 3 is supported by a bearing 4 and by lateral thrust shims 5 immediately behind the impeller 2 while the rotor 8 is centered with the aid of a separate radial bearing which consists of a running bearing ring 6 and a stationary bearing ring 7.

Within the coupling housing 1, 1', a driver 10 is supported in bearings on a shaft which is only partially shown and to which the driver 10 is screwed by a shaft nut 9. The driver 10 has a bell shape. Within the cavity of the driver is placed a double-walled isolation shell 11 which also like a bell encloses the rotor 8. On the outside of the rotor 8 as well as on the inside of the driver 10, permanent magnets 12 are arranged in pairs, the poles of which change from one permanent magnet to the adjacent permanent magnet in reference to either the driver 10 or the rotor 8. In other words, a south pole of the driver 10 is opposite a north pole of the rotor 8 while the juxtaposed pair of magnets has changed places. With the aid of these permanent magnets 12 the driving force of the driver 10 which is driven by an electric motor (not shown) is transferred via the rotor 8 onto the impeller 2.

The double-walled isolation shell 11 comprises an outer shell 15 as well as an inner shell 16 which are placed one into the other and which lie against each other under pretension in their cylindrical sections. In the area of the bottom, a distance is kept between both shells 15 and 16 which is in the order of 10ths of a millimeter, thus smaller than is shown in the figure of the drawing.

In the cylindrical section of the outer shell 15 as well as the inner shell 16 is a screw channel 17 which is cut or pressed into the side of the outer shell 15 and which terminates in a premium chamber like ring chamber 18. The screw channel 17 is so much extended that the space between the two bottoms of the shells 15 and 16 is in flow conducting connection with the screw channel 17. A bore 19 leads to the ring chamber 18 connecting the ring chamber 18 with a fitting thread 20. Here, conduits, hoses, pressure gauges, fluid sensors or the like may be attached so that the cavity of the screw channel 17 as well as the space between the bottoms of the shells 15 and 16 may be subjected to a pressure or a vacuum. It is apparent that via this connection 20 a check and control of the intactness of both shells 15 and 16 may be carried out in such a way that an alarm is always set when the screw channel 17 and respectively the space between the bottoms of the two shells is filled with the medium to be pumped (damaged inner shell 16) or respectively with the atmosphere (damaged outer shell 15).

The screw channel 17 may be formed in different ways as long as a sufficient control function is retained. For a reliable control, a depth of some 10ths of a millimeter may be sufficient while the pitch is chosen so that, on the one hand, a satisfying penetration of the cylindrical area is achieved and, on the other hand, the outer shell is not unnecessarily weakened. In the shown embodiment, the outer shell 15 and the inner shell 16 are both capable of resisting the pressure from the pump and the attached tube system so that upon damage of one of both shells, there is no danger of a blow.

Instead of the screw channel 17, other forms of penetrations of the space between both shells may be used, for instance longitudinal grooves may be distributed regularly around the cylindrical face between which cross-connections are engraved, pressed or formed. It is only important that the space between both shells is substantially covered in its entirety and the weakening of the double-walled isolation shell is altogether rather small.

I claim:

1. A magnetic pump drive comprising a driver driven by a motor, a rotor encircled by the driver and connected with an impeller of the pump, the driver and rotor having an identical number m of permanent magnets on opposite cylindrical faces, of which two opposing magnets form a pulling pair, a stationary isolation shell having a cylindrical section and encircling the rotor, the stationary isolation shell being in contact with the medium to be pumped on its inside and sealed against the housing of the pump, and through which shell the force of the permanent magnets passes for effecting the drive from the driver to the rotor, the isolation shell particularly comprising an outer and an inner shell, the outer shell and the inner shell making contact against each other at least in the cylindrical section and comprising a channel system in the outer shell in the area of contact between the outer and inner shells.

2. The magnetic pump drive according to claim 1, in which at least a portion of the channel system has the shape of a screw channel cut into the outer shell.

3. The magnetic pump drive of claim 1 in which the entire channel system has the shape of a screw channel cut into the outer shell.

4. The magnetic pump drive accordingly to claim 1 wherein the channel system ends in a premium chamber which is connected to a threaded connection via a bore.

5. The magnetic pump drive according to claim 1 wherein the contact surface of the outer shell lies against the contact surface of the inner shell under pretension.

6. The magnetic pump drive according to claim 4 wherein the ends of the outer shell and the inner shell are welded together.

7. The magnetic pump drive according to claim 1 wherein the outer shell and the inner shell consist of different materials.

8. A magnetic pump drive comprising a driver driven by a motor, a rotor encircled by the driver and connected with an impeller of the pump, the driver and rotor having an identical number m of permanent magnets on opposite cylindrical faces, of which two opposing magnets form a pulling pair, a stationary isolation shell having a cylindrical section and encircling the rotor, the stationary isolation shell being in contact with the medium to be pumped on its inside and sealed against the housing of the pump, and through which shell the force of the permanent magnets passes for effecting the drive from the driver to the rotor, the isolation shell particularly comprising an outer and an inner shell and the inner shell making contact against each other at least in the cylindrical section and comprising a channel system in the area of contact between the outer and inner shells, the channel system being in the outer shell and having the shape of a screw channel.

9. A magnetic pump comprising a driver driven by a motor, a rotor encircled by the driver and connected with an impeller of the pump, the driver and rotor having an identical number m of permanent magnets on opposite cylindrical faces, of which two opposing magnets form a pulling pair, a stationary isolation shell having a cylindrical section and encircling the rotor, the stationary isolation shell being in contact with the medium to be pumped on its inside and sealed against the housing of the pump, and through which shell the force of the permanent magnets passes for effecting the drive from the driver to the rotor, the isolation shell particularly comprising an outer and an inner shell, the outer shell and the inner shell making contact against each other at least in the cylindrical section and comprising a channel system in the area of contact between the outer and inner shells, the channel system being in the outer shell and comprising regularly distributed, interconnected grooves.

10. A magnetic pump drive comprising a driver driven by a motor, a rotor encircled by the driver and connected with an impeller of the pump, the driver and rotor having an identical number m of permanent magnets on opposite cylindrical faces, of which two opposing magnets form a pulling pair, a stationary isolation shell having a cylindrical shell and encircling the rotor, the stationary isolation shell being in contact with the medium to be pumped on its inside and sealed against the housing of the pump, and through which shell the force of the permanent magnets passes for effecting the drive from the driver to the rotor, the isolation shell particularly including an outer and an inner shell, the outer shell and the inner shell making contact against each other at least in the cylindrical section and including a channel system in the area of contact between the outer and the inner shells, the contacting surfaces of the outer shell and the inner shell being bonded to each other.

11. The magnetic pump drive according to claim 10 wherein the contacting surfaces of the outer shell and the inner shell are glued to each other.

12. The magnetic pump drive according to claim 10 wherein the contacting surfaces of the outer shell and the inner shell are soldered to each other.

13. The magnetic pump drive according to claim 10 wherein the contacting surfaces of the outer shell and the inner shell are brazed together.

14. The magnetic pump drive according to claim 10 wherein the contacting surfaces of the outer shell and the inner shell are attached to each other by diffusion welding.

15. The magnetic pump drive according to claim 1 wherein the stationary isolation shell including a bottom section connected to the cylindrical section, the outer shell including a bottom wall, the inner shell including a bottom wall, and a gap defined by a distance between said bottom walls.

16. The magnetic pump drive according to claim 8 wherein the stationary isolation shell including a bottom section connected to the cylindrical section, the outer shell including a bottom wall, the inner shell including a bottom wall, and a gap defined by a distance between said bottom walls.

17. The magnetic pump drive according to claim 9 wherein the stationary isolation shell including a bottom section connected to the cylindrical section, the outer shell including a bottom wall, the inner shell including a bottom wall, and a gap defined by a distance between said bottom walls.

18. The magnetic pump drive according to claim 10 wherein the stationary isolation shell including a bottom section connected to the cylindrical section, the outer shell including a bottom wall, the inner shell including a bottom wall, and a gap defined by a distance between said bottom walls.

* * * * *